(12) United States Patent
Devlin et al.

(10) Patent No.: US 8,113,332 B2
(45) Date of Patent: Feb. 14, 2012

(54) CONVEYOR SYSTEM

(75) Inventors: Anthony Devlin, Coalisland (IE); Paul McDermott, Newtowncunningham (IE)

(73) Assignee: Terex GB Ltd., Dungannon, Co. Tyrone (GB)

( * ) Notice: Subject to any disclaimer, the term of this patent is extended or adjusted under 35 U.S.C. 154(b) by 175 days.

(21) Appl. No.: 12/463,120

(22) Filed: May 8, 2009

(65) Prior Publication Data

US 2009/0308718 A1    Dec. 17, 2009

(30) Foreign Application Priority Data

May 9, 2008    (GB) .................................. 0808463.4

(51) Int. Cl.
*B65G 15/26*    (2006.01)
(52) U.S. Cl. ........................................ 198/313; 198/632
(58) Field of Classification Search .................. 198/313, 198/314, 581, 584, 632, 861.5; 414/523
See application file for complete search history.

(56) References Cited

U.S. PATENT DOCUMENTS

| 43,971 | A | * | 8/1864 | Clark | 198/632 |
|---|---|---|---|---|---|
| 406,788 | A | | 7/1889 | Sprague | |
| 2,742,140 | A | | 4/1956 | Ronk et al. | |
| 2,939,226 | A | | 6/1960 | Ronk et al. | |
| 3,599,784 | A | * | 8/1971 | Rossi | 198/313 |
| 4,245,732 | A | * | 1/1981 | Couperus | 198/313 |
| 4,523,669 | A | | 6/1985 | Smith | |
| 2005/0123385 | A1 | * | 6/2005 | Kirsch | 198/313 |
| 2006/0180436 | A1 | | 8/2006 | Heeszel et al. | |

FOREIGN PATENT DOCUMENTS

| GB | 2052419 | * | 1/1981 | 198/313 |
|---|---|---|---|---|
| GB | 2282361 A | | 4/1995 | |
| WO | WO 91/09797 | | 7/1991 | |

OTHER PUBLICATIONS

International Search Report dated Mar. 10, 2009 (UK Priority Application No. 0808463.4).

* cited by examiner

*Primary Examiner* — James R Bidwell
(74) *Attorney, Agent, or Firm* — Boyle Fredrickson, S.C.

(57) ABSTRACT

A foldable side frame for a side conveyor system of a screening unit for processing materials that allows placing the side conveyor system within an envelope of a screening device. The system includes a base, mid and upper frame section of the side conveyor system, and a number of variable length rams that pivot the mid frame relative to the base frame about a first pivot axis and a pivot the upper frame relative to the mid frame about a second pivot axis in which in the operative position the first and second axes are obliquely angled relative to one another.

31 Claims, 7 Drawing Sheets

CONVEYOR SYSTEM

CROSS-REFERENCE TO RELATED APPLICATION

This application claims priority to Great Britain Patent Application GB 0808463.4 filed on May 9, 2008 and the contents of which are expressly incorporated herein.

BACKGROUND

The invention relates to a conveyor system, and particularly to foldable frames for side conveyor systems of screening units.

Screening units are used in many applications for the processing of various materials, such as sand, gravel, stone, soil and aggregate material. Such units comprise a screening device, and one or more conveyor systems on frames to carry the various types or grades of screened material to individual stockpiles. It is desirable that these screening units be movable from place to place within a worksite, and, indeed, from site to site. To achieve this one or more of the conveyor systems, particularly any side conveyor systems, are usually placed in a folded position prior to transport of the unit. If the unit is to be moved to a different site, it is important that the conveyor systems fold as close to the unit as possible, to meet the restrictions imposed on the width of vehicles travelling on public highways. This has become increasingly important as transportation of wide loads on roads and motorways has become more restrictive. Even if a unit is to remain in the same place within a site, it is desirable that the conveyor systems be placed in a folded position, to avoid inadvertent damage to them. Foldable conveyor systems and foldable frames for such systems have been developed, but many of these have experienced problems, for example in the ease of folding, or the strength of the frame and particularly in relation to the overall width or envelope of the folded screening unit.

Alternative mechanisms have been proposed that allow an upper section of a conveyor frame to fold such that the frame may be located above and in line with a body of the screening unit in the inoperative position. A disadvantage that has arisen with such arrangements is that relative lengths of sections of the frame may be restricted by the need to fold the frame over and along a body of the screening unit.

BRIEF DESCRIPTION OF THE INVENTION

According to a first aspect of the present invention there is provided a conveyor system comprising a base frame section, a mid frame section movably connected to the base frame section and an upper frame section movably connected to the mid frame section, at least one support means movably connected at a first end thereof to the base frame section and at a second end thereof to the mid frame section, first operating means operable on the mid frame section, and second operating means operable on the upper frame section, the first and second operating means acting to move the mid and upper frame sections between an operative position wherein they lie substantially in line with each other and the base frame section, to an inoperative position wherein the mid and upper frame sections are displaced with respect to the base frame section, the first operating means acting to pivot the mid frame section relative to the base frame section about a first pivot axis, and the second operating means acting to pivot the upper frame section relative to the mid frame section about a second pivot axis wherein in the operative position the first and second pivot axes are obliquely angled relative to one another.

According to a second aspect of the present invention there is provided a conveyor system comprising a base frame section, a mid frame section movably connected to the base frame section and an upper frame section movably connected to the mid frame section, first operating means operable on the mid frame section, and second operating means operable on the upper frame section, the first and second operating means acting to move the mid and upper frame sections between an operative position wherein they lie substantially in line with each other and the base frame section, to an inoperative position wherein the mid and upper frame sections are displaced with respect to the base frame section, the first operating means acting to pivot the mid frame section relative to the base frame section about a first pivot axis, and the second operating means acting to pivot the upper frame section relative to the mid frame section about a second pivot axis wherein in the operative position the first and second pivot axes are obliquely angled relative to one another.

There may be provided at least one support means movably connected at a first end thereof to the base frame section and at a second end thereof to the mid frame section. In some embodiments there may be provided at least two such support means. Such support means can help to support the load of the conveyor on the base frame section.

The arrangement is most preferably such that when the frame (and associated conveyor system) is placed in the inoperative or transport position, the frame is suitably positioned for storage and transportation.

It is also a desired feature of screening units that they should have longer conveyors. Since the conveyor systems generally extend upwardly and outwardly from the screening unit the longer the conveyor system is the further it extends away from the screening unit and to a greater height. This enables more material to be sorted and stock piled by the screening unit thus increasing the amount of material that can be sorted by the screening unit. An advantage of the conveyor system and screening unit according to the invention is that a longer conveyor belt may be incorporated in the screening unit, thus increasing height of the pile of material that can be sorted and thus the total amount of material that can be sorted by the screening unit before it becomes necessary to move the unit to a new position.

The base frame section may be secured to a screening unit. Alternatively the base frame section may be a part of the screening unit. As in conventional conveyor systems the conveyor frame may provide support for a conveyor belt in a manner well known to those skilled in the art. The base frame section may provide support for a conveyor extending outwardly from the screening unit in a first plane.

A further advantage is that the side conveyor frame may be folded in the transport position within the width of the screening unit and therefore does not add to the width or envelope of the body of the screening unit. In a preferred embodiment the conveyor system may be rotated to extend rearwardly of a screening unit in the inoperative position. This is particularly advantageous in that it is preferable to add to the length of the screening unit rather than to the width of the unit since long loads are easier to transport in terms of regulations than wide loads.

The base frame section is preferably connected to the mid frame section by means of a pivot joint. The pivot joint preferably comprises a pin mounted between two opposing plates that may be mounted or welded or otherwise secured to the base frame section. The pivot pin may provide means of movably mounting the mid frame section on the base frame section. Preferably the opposing plates and the pin extending between the plates are mounted on the base frame section such that the first pivot axis aligned with the pin is at a first angle to the horizontal and at a second angle to the vertical. The first pivot axis is obliquely angled with respect to the second pivot axis.

Preferably the at least one support means is movably connected to the base frame section by means of at least one further pivot joint. The further pivot joint may comprise a rotatable shaft extending from the base frame section, and first and second pivot plates mounted on a support member connected to the mid frame section. A pivot pin may extend between the opposing plates.

Preferably the mid frame section is connected to the base frame section by means of first and second support means. Each support means may be connected to the base frame section by means of pivot joints comprising first and second rotatable shafts and opposing plates and pins extending therebetween. Each support means may comprise a telescopic member. In a preferred embodiment each support means comprises a telescopic leg comprising a first member and a second member. The length of the each leg may be fixed or may change during movement of the mid frame between operative and inoperative positions, e.g. it may become shorter and/or longer, using, for example, a sliding mechanism. At least a portion of the first member is preferably received and slides within the second member, thereby decreasing and increasing the length of the leg. For example one or both of the first and second members may be constituted by a telescoping box section. Each support means is preferably hinged to the mid frame by means of an additional upper pivot hinge. Each upper pivot hinge may be arranged to allow the mid frame to rotate about the base frame section.

In a preferred embodiment the telescopic legs may increase and decrease in length as the mid frame rotates about the first pivot axis and moves the mid frame section from the operative to the inoperative position. The first support member may increase in length while the second support member decrease in length. The support members may vary in length by differing amounts. As the mid frame rotates about the first pivot axis the support members change in length and the members pivot about the further pivot joints. As the support members move about the further pivot joints the opposing plates and the pin mounted therebetween rotate as the rotatable shaft rotates. The upper pivot joint allows further movement between the mid frame and the support means such that the support means allow the mid frame to rotate about the first pivot axis.

Operating means are provided that act on the mid frame to cause the mid frame to move relative to the base frame section. Preferably the operating means comprise at least one hydraulic ram operative on the support means.

Preferably where there are two support means a hydraulic ram is provided on each support means and is operative to lengthen or shorten the support means in order to act on the mid frame and cause it to rotate about the first pivot axis.

The support members act to support the mid frame section when in its operative position, thereby increasing the overall strength of the frame.

The first operating means may be directly connected between the base and mid frame sections, or may be indirectly connected between the two. The second operating means may also comprise one or more hydraulic rams. The hydraulic rams of the second operating means preferably operate simultaneously with the operating means operable on the mid frame section. If the first and second operating means are both hydraulic rams they may be connected to the same hydraulic valve to achieve this.

The base section frame may further comprise a cassette mounting frame on which a hopper cassette may be mounted. The hopper cassette may also provide a housing for a main pulley for the belt. The base section frame may provide a mounting for the rollers for the conveyor belt.

The base, mid frame and upper sections may each be at least partially ladder-like in construction. Each section may comprise first and second substantially parallel elongate members spaced apart by one or more rungs. The sections or each rung may be provided with a carrying member, for carrying a conveyor belt. Alternative conveyor belt support arrangements may be incorporated.

The mid frame section may be connected to the upper frame section by means of a second pivot joint. The second pivot joint may comprise at least one pivot plate attached to the mid frame section and at least one pivot plate attached to the upper frame and a pivot pin connected to the plates and defining a second pivot axis about which the upper frame section pivots relative to the mid frame section. At least one of the pivot plates may be attached to a rung or other transversely extending element of the mid frame section. When one pivot joint is provided, the plates may be attached to the rung or transversely extending element in an approximately central position thereof. The upper frame section may comprise a pair of elongate members. A first end of each elongate member may be connected to the pivot pin of the pivot joint, and a second end thereof may be provided with a fork-like structure for supporting a conveyor belt.

In a particularly preferred embodiment the upper frame is connected to the mid frame by means of a pivoting arm arrangement. A first arm or pair of arms extend from the mid frame and are pivotally connected to a second arm or arms connected to the upper frame. A third arm depends from the first arm or pair of arms or each pivotal connection to the mid frame. Second operating means are preferably connected to at least one of the first arms and may operate thereon to shorten the first arm causing the upper frame to rotate about a second pivot axis.

Preferably the second pivot axis is located substantially in the plane of the mid and upper frames when they are in the operative position. In a preferred embodiment a third pivot axis may be located at a distance from the second pivot axis and displaced from the plane of the mid and upper frames in the operative position.

Preferably the upper frame section rotates about the second pivot axis and folds over and parallel to the mid frame section and may rest on or abut against the mid frame section in at least the transport position. The second pivot axis is preferably transverse to a longitudinal axis of the mid frame in the operative position. Preferably the upper frame section is parallel to the mid frame section in the transport or inoperative position. It is envisaged that in an alternative embodiment the upper frame section may be arranged to slide relative to the mid frame section rather than rotate into the inoperative position.

As the mid and upper frame sections preferably pivot in one plane only, the pivot joints by which the mid and upper frame sections are connected may be simple. For example, it is not necessary to provide universal type pivot joints. The second pivot axis about which the upper frame section pivots with respect to the mid frame section, and the first pivot axis about which the mid frame section pivots with respect to the base frame section are arranged to be obliquely angled with respect to each other. This allows the mid and upper frame sections to rotate to lie within or against an envelope of a screening unit to which the frame may be attached.

The base frame section may be fixedly attached to a screening unit. When the frame is in its operative position, the base, mid and upper frame sections preferably extend away from the unit in an upward direction, for example they may project out at right angles to the unit and be upwardly inclined at an angle of approximately 20-30 degrees to the horizontal. Preferably, the frame sections are upwardly inclined at an angle of approximately 22 degrees to the horizontal. Other angles may be utilised depending on the desired reach and inclination of the conveyor system. The frame is preferably attached to a side portion of the screening unit, and supports a side conveyor belt. The conveyor belt may be between 500 and 1000 mm wide. A particularly desired width is 900 mm wide. When folded into the inoperative position, the mid and upper frame sections of the frame preferably lie at least substantially parallel to the side of the unit, and extend longitudinally therefrom preferably in a rearward direction.

According to a third aspect of the present invention there is provided a screening unit comprising one or more conveyor systems according to the first aspect of the invention.

Preferably the side conveyor system is arranged to be located near an end of the screening unit. More preferably the side conveyor system may be arranged so that the frames of the conveyor system may be rotated to extend longitudinally from an end of the unit in the transport position and to extend rearwardly within the width of the screening unit.

Alternatively the conveyor system is located away from the rear of the screening unit. In the case the mid and upper frame sections may rotate to abut the envelope of the screening unit in the transport or inoperative position. In a preferred embodiment the screening unit may be arranged so that the folded upper and mid frame sections may rest in a recess or cut back section of a side of the screening unit.

According to a fourth aspect of the present invention there is provided a foldable frame for a conveyor system comprising a first frame section and a second frame section pivotably connected to the first frame section and operating means operable on the second frame section the operating means acting to move the second frame section between an operative position wherein the first and second sections lie substantially in line with each other and an inoperative position wherein the second frame section is folded with respect to the first frame section, the operating means acting to pivot the second frame section relative to the first frame section about a pivot axis wherein the pivot axis comprises a fixed pivot hinge arranged such that the pivot axis is at a first angle with respect to a horizontal plane and at a second angle with respect to a vertical plane.

Preferably the first and second frames each have belt supporting means and the pivot hinge is angled such that the second frame can be pivoted from an operative position in which the belt supporting means of the first and second means are substantially in line with one another to an inoperative position in which the belt supporting means of the second frame are substantially vertically orientated.

In a preferred embodiment the foldable frame may comprise a further upper frame. The upper frame may be movably connected to the second frame. The upper frame may be movably connected to the second frame by means of a pivot joint. A second pivotal axis of the pivotal joint between the upper and mid frames is preferably inclined to the first pivotal axis.

BRIEF DESCRIPTION OF THE DRAWINGS

An embodiment of the invention will now be described by way of example only, with reference to the accompanying drawings, in which.

DETAILED DESCRIPTION

Figure 1:
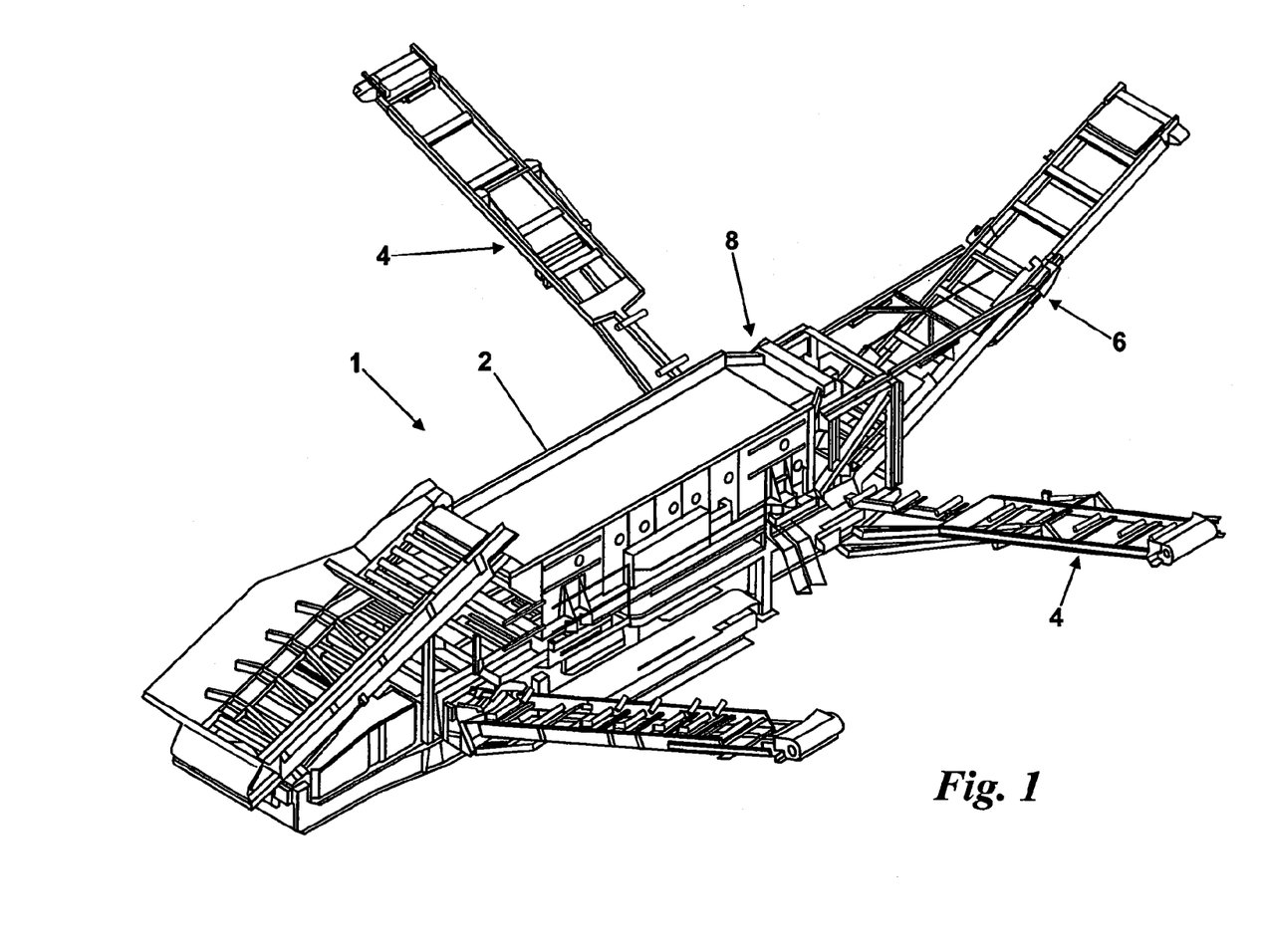
FIG. 1 is a perspective view of a screening unit incorporating a conveyor system according to the present invention shown in the operative position.

A screening unit 1 comprises a body 2 which has a number of side conveyor systems generally indicated at 4. The screening unit also has at least a rear conveyor system 6 extending from a rear 8 of the screening unit 1.

Figure 2:
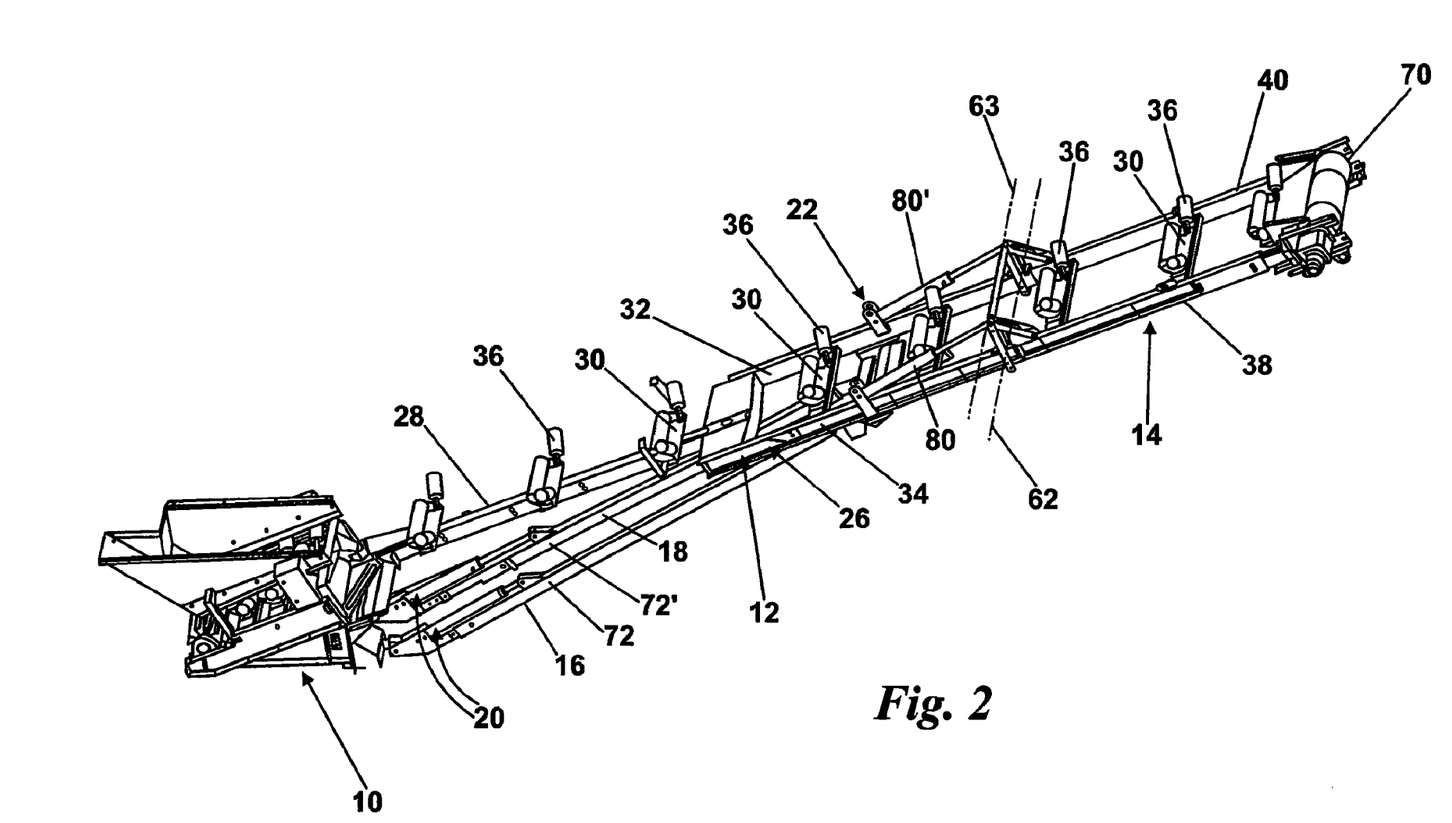
FIG. 2 is a perspective view of the conveyor system of the screening unit shown in the operative position.

A typical conveyor system in accordance with the invention may be seen in FIG. 2. Each side conveyor system comprises a base frame section 10, a mid frame section 12 connected to the base frame section, and an upper frame section 14 connected to the mid frame section. A first support member 16 and a second support member 18 are each connected between the base frame section and the mid frame section. A first operating means 20 is connected between the base frame section and the mid frame section, and a second operating means 22 is connected between the mid frame section 12 and the upper frame section 14. In the illustrated embodiment the first and second operating means 20 and 22 each comprise a pair of hydraulic rams the operation of which will be described in more detail later.

The mid frame section comprises a lower portion 24 and an upper portion 26. The lower portion has a central elongate member 28. The central elongate member 28 has rungs 30 fixed to the elongate member by welding or by other suitable means. The rungs provide support for a conveyor belt (not shown) which transports sorted material along the conveyor system and deposits the material from the end of the conveyor.

The upper portion 26 of the mid frame section 12 comprises first and second side elongate members 32 and 34 respectively. The side elongate members are spaced apart and fixed substantially parallel to each other by rungs 30. The rungs are fixed to the elongate members for example by welding. The rungs 30 each have a carrying member 36 attached thereto, for carrying a conveyor belt (not shown).

The upper frame section comprises first and second side elongate members 38 and 40 which extend substantially in the same plane and parallel with the first and second elongate side members 32 and 34 of the mid frame. As in the mid frame the side elongate members of the upper frame are spaced apart and fixed substantially parallel with each other by rungs 30 which may be fixed to the elongate members by welding or other suitable means and have a carrying member 36 attached thereto to carry a conveyor belt (not shown).

Figure 3:
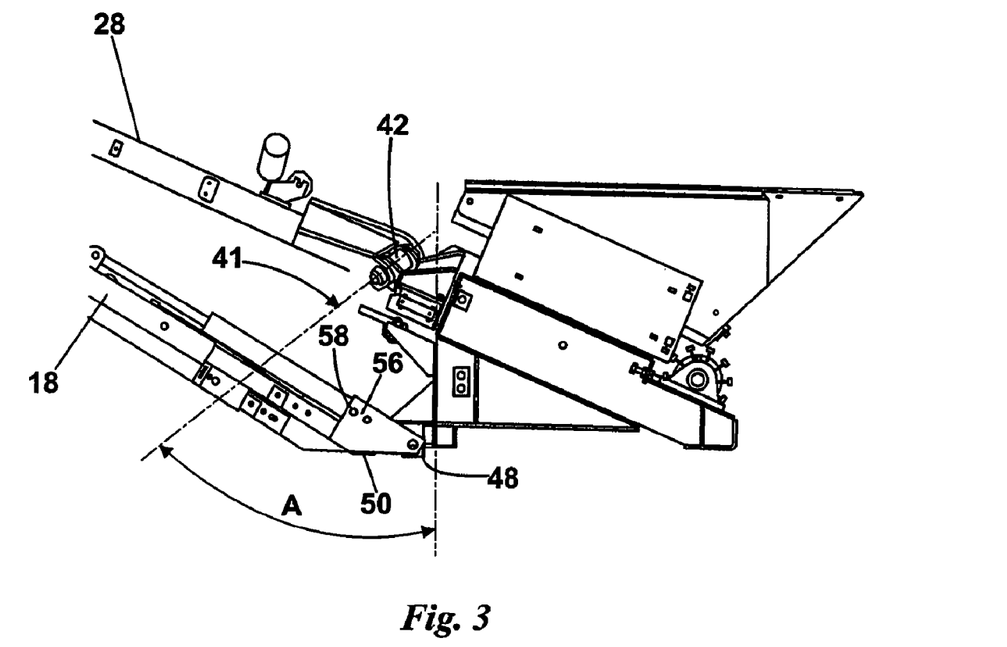
FIG. 3 is a side view of a base frame and mid frame of the conveyor system showing a first pivotal connection.

The mid frame section is moveably connected to the base frame section about a first pivotal axis 41 defined by a pivot hinge 42. The pivot hinge is most clearly seen in FIGS. 3 and 4. As can be seen in FIG. 3 the hinge 42 comprises a pin 44 extending between two opposing plates 46, 46'. The pin 44 and plates 46, 46' are mounted on a box section portion 48 of the base frame section. The box section portion, plates and pin do not rotate relative to the box frame. The pin 44 is in a preferred embodiment a 2" pin and is well adapted to carry significant weight and stress since a substantial portion of the weight of the mid and upper frames is distributed through the pin to the base section frame. As can be seen in FIG. 3 the pin 44 is arranged at an angle A relative to a vertical plane.

Figure 4:
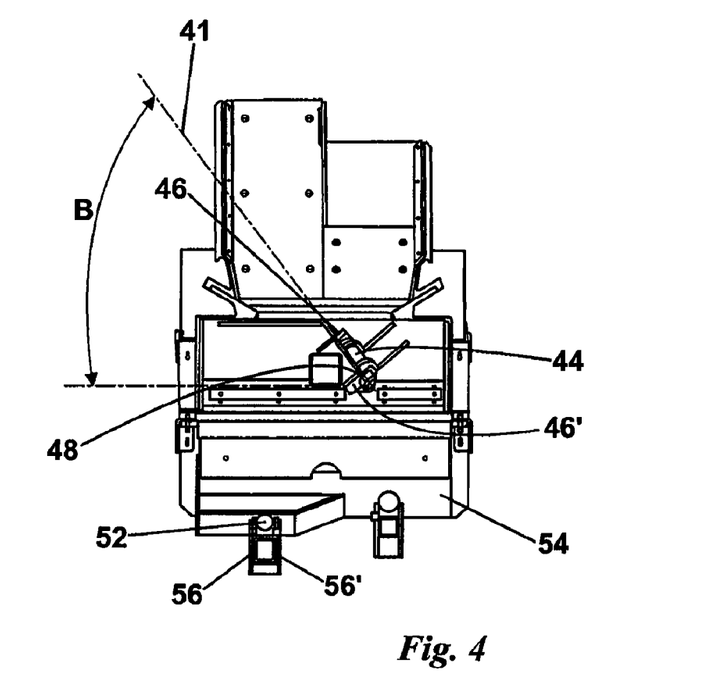
FIG. 4 is a front view of the base frame and mid frame illustrated in FIG. 3.

In FIG. 4 it can be seen that the pin 44 is arranged at a second angle B to a horizontal plane. The elongate member 28 of the mid frame is mounted on the pin 44 and is able to rotate about the first pivot axis 41. As the pivot axis 41 is orientated so as to be angled in two planes the mid frame rotates about the axis in two planes and is able therefore to move from an operative position in which the base frame and mid frame sections are substantially in line with one another to an inoperative position in which the mid frame is displaced and rungs 30 on the mid frame have moved from a substantially horizontal orientation to a substantially vertical orientation.

The mid frame is also connected to the base frame section by means of two support means in the form of telescopic legs. These will be described in more detail in due course.

Each telescopic leg is connected to the base frame section by connecting means comprising a first pivot joint 48 and a second pivot joint 50. The first pivot joint comprises a shaft or other rotatable member 52 extending outwardly from a depending wall 54 of the base section frame. The shaft may be a square section block that is rotatable by means (not shown) within the base section. A pair of opposing plates 56, 56' and a pin 58 are mounted on the shaft 52 and are connected to the first support member 16 which extends from the base frame section to the mid frame section and connects to a transversely extending strut 60 extending between the first and second elongate members 32 and 34 of the upper portion 26 of the base frame section. A second pivot joint 48' is attached to a second shaft 52' extending from and the depending wall of the base frame section and is similarly hinged by means of plates 56' and a pin 60' to the second support member 18. The first and second support members can hinge about the pins 58, 58' and the shafts 52, 52' also rotate allowing the support members 16, 18 to follow the movement of the elongate member 28 as it rotates about the first pivot axis 41. As the operating means act on the support members the members are able to rotate about the pins and in addition the shaft rotates such that the pins move from being substantially horizontally orientated in the operative position to being substantially vertically orientated in the inoperative position.

The support members also support some of the weight of the mid and upper frames thus helping to reduce the strain on the pin 42.

The upper frame section is connected to the mid frame section about a second pivot axis 62. A third pivot axis 63 in this embodiment comprises two pivot joints spaced transversely apart. Each pivot joint comprises a first pivot arm 64 is attached to one of the elongate members of the mid frame section, a second pivot arm 66 attached to a corresponding elongate member of the upper frame section and a pivot pin 68 which connects the arms 64 and 66 together and about which the upper frame pivots relative to the mid frame. The pivot pins 68 lie parallel to and in line with each other, and the elongate members 36 and 38 of the upper frame section therefore pivot in part about the third pivot axis 63 defined by these pivot pins. This pivot axis is transverse to the longitudinal axis of the conveyor system in the operative position.

Figure 5A:
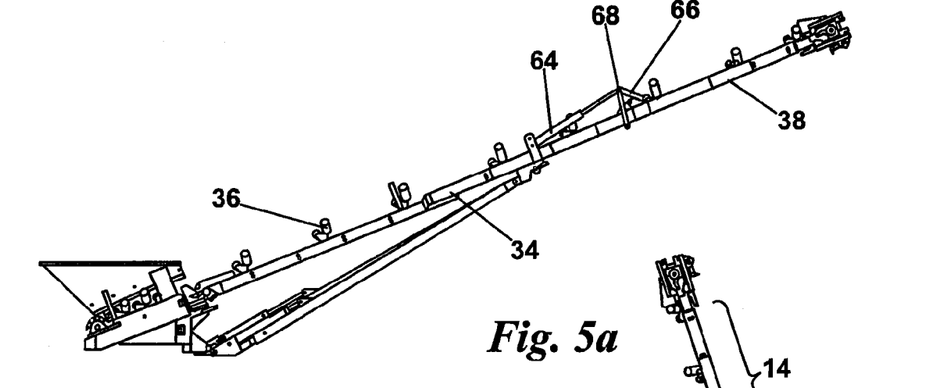
FIG. 5a to 5c show the folding of an upper frame section relative to a mid frame section of the conveyor system between the operative position and an inoperative position.
Figure 5B:
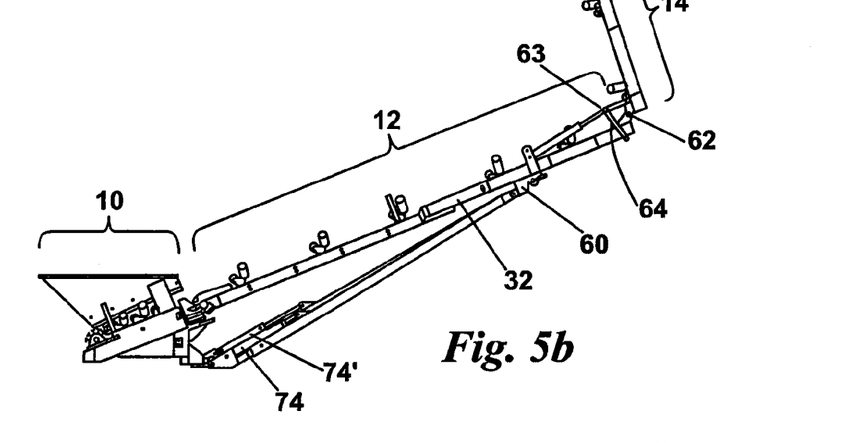
Figure 5C:
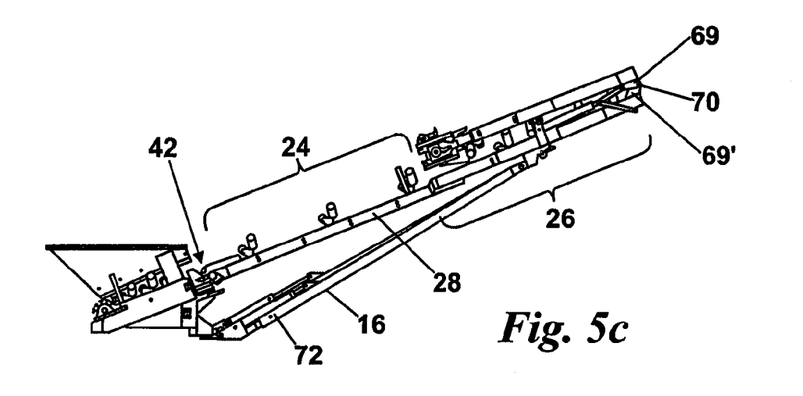

A further arm 64 depends from the pivot pins 68 to the mid frame and connects thereto. The arm 64 may rotate to operate on the upper frame and cause the upper frame to rotate about the second and third axes. The second axis can be most clearly seen in FIG. 5b where the axis is indicated at 63. It can be seen that the second axis is substantially in line with the mid and upper frames when they are in the operative position.

In this embodiment pivot plates 69, 69' connected by pivot pins 70 provide the main connection between the upper and the mid frame.

In an alternative embodiment the second pivot axis 62 may comprise a single pivot joint which may preferably be centrally located relative to a transverse direction of the mid and upper frame sections.

Carrying members 36 are attached at intervals along the elongate members, for supporting a conveyor belt (not shown). Means 70 are provided for supporting axle pins of a roller (not shown) which serves to support and guide the outboard end of the conveyor belt. The support means 70 is of conventional form and will not be further described.

The pivot pins 68 provide the second pivot axis 42 about which the upper frame pivots relative to the mid frame section. The second and third pivot axis 62, 63 lie substantially perpendicular to a longitudinal axis of the conveyor system in the operative position. The mid frame section rotates relative to the base frame section about the first pivot line. The first pivot axis is at an oblique angle to the second and third pivot axes. Accordingly, as the mid frame moves about the first pivot axis it passes through two planes swinging laterally and simultaneously twisting about its longitudinal axis during its movement from the operative to inoperative position. However the upper frame section rotates through one plane as it rotates about the third pivot axis 43.

The first support member comprises a first leg 72 which is of box section and which is attached to a depending front wall 54 of the base frame section, and by a simple pivot joint to a cross-tree 60 of the mid frame section. The length of this leg can change, e.g. it can be telescopically extended by up to about 280 mm in order to accommodate any variations in the distance between its end pivots during folding movement of the frame between the operative position and the inoperative position. The second support member 18 comprises a second leg 72' which is also of box section and whose length varies as the frame is moved between operative and inoperative positions. The second support member 18 in this embodiment may vary in length similarly to the variation in length of the first leg. In this embodiment the second leg varies in length by 435 mm. It will be understood that the particular variance in length is dependent on the angle of the conveyor system and the length of the first and second legs and the angle through which the mid frame rotates in moving from the operative position to the inoperative position. Like the leg of the first support member 16 the second leg 72' comprises a first member attached to the depending front wall 54 of the base section, and a second member attached by a simple pivot joint to the cross tree 60 of the mid frame section. The pivot joint is arranged to provide sufficient clearance that the mid frame can rotate from the operative to the inoperative position. The first member telescopes within the second member, thereby decreasing and increasing the length of the leg. Each support member 16, 18 may increase or decrease in length and in the described embodiment one leg increases in length and the other decreases in length as the mid frame moves about the first pivot axis. As the mid frame moves in the opposite direction the change in length of the legs is reversed.

As has been referred to before, the first operating means comprises a hydraulic ram. In this embodiment a hydraulic ram 74, 74' is provided on each of the first and second support members. The housing of each ram is attached to the pivot joints and respectively and then to a point on the respective support member 16 and 18. Each ram is attached to a hydraulic valve (not shown), and from there to a hydraulic fluid reservoir (also not shown). Fluid from the reservoir activates each ram, causing the piston to move into and out of the housing thus causing the respective support member section to extend or retract and pivot about the pivot joints.

Figures 6A, 6B, 6C:
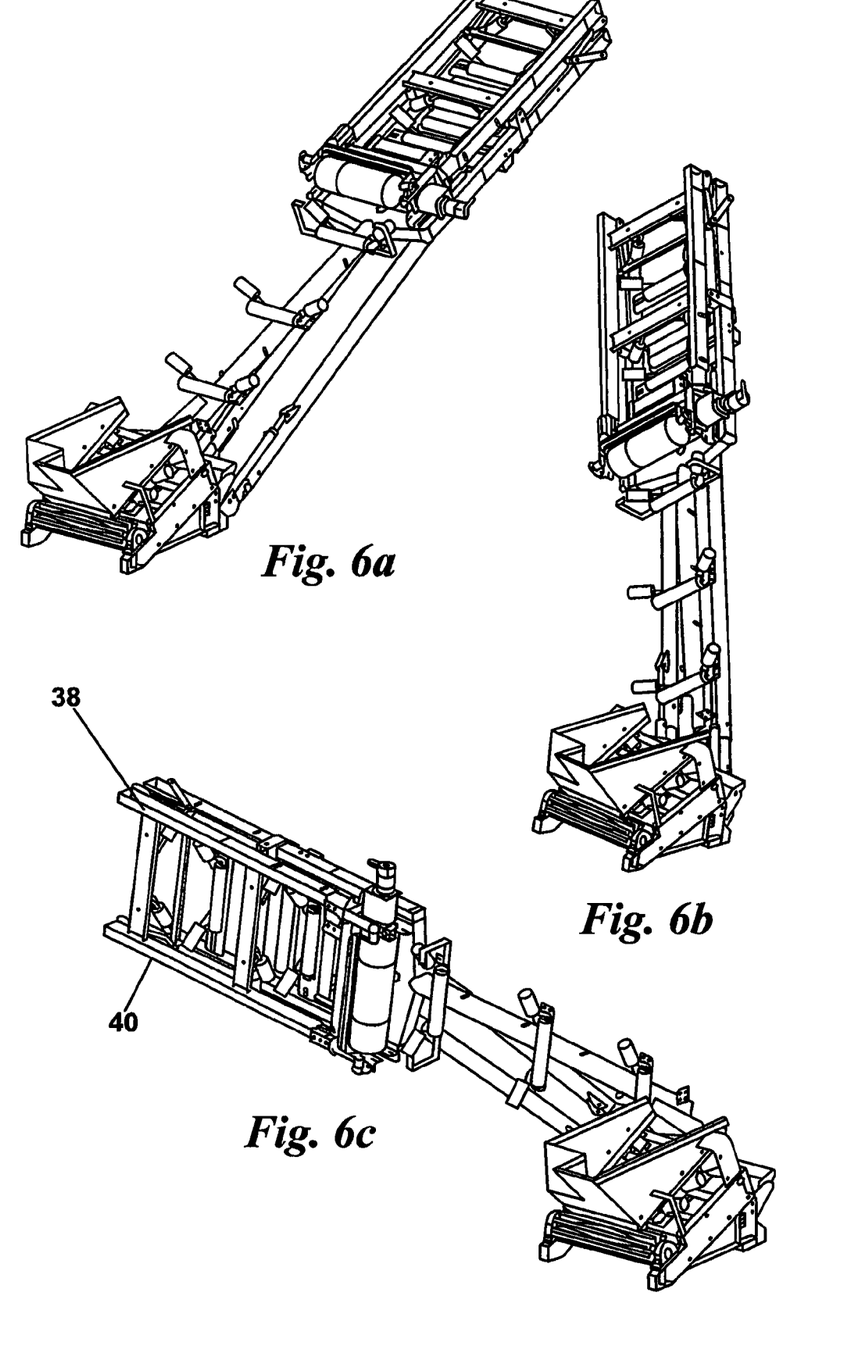
FIGS. 6a to 6c show the folding of a mid frame section relative to a base frame section.
Figure 7:
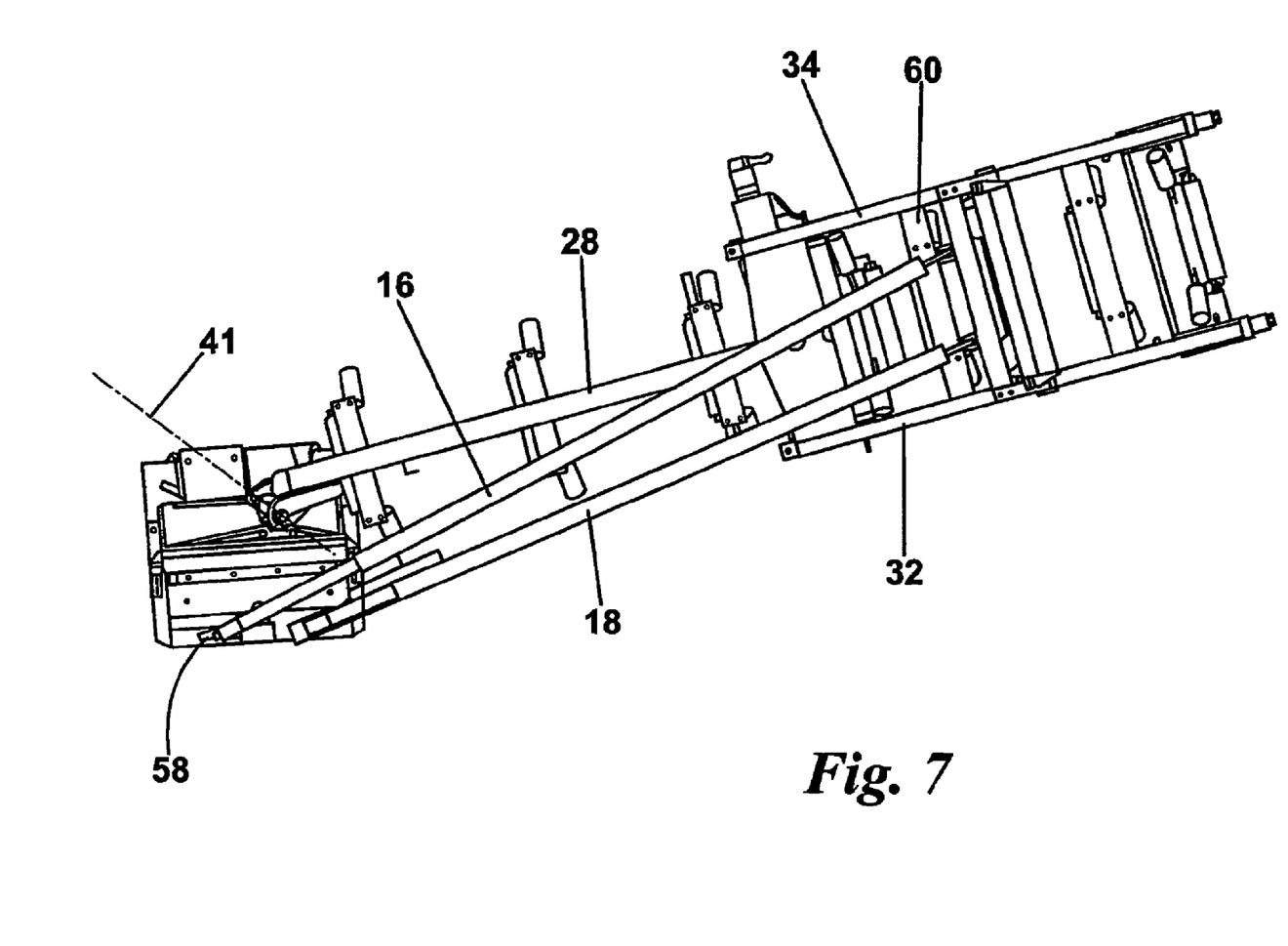
FIG. 7 is a front view of the conveyor system shown in the inoperative position.
Figure 8:
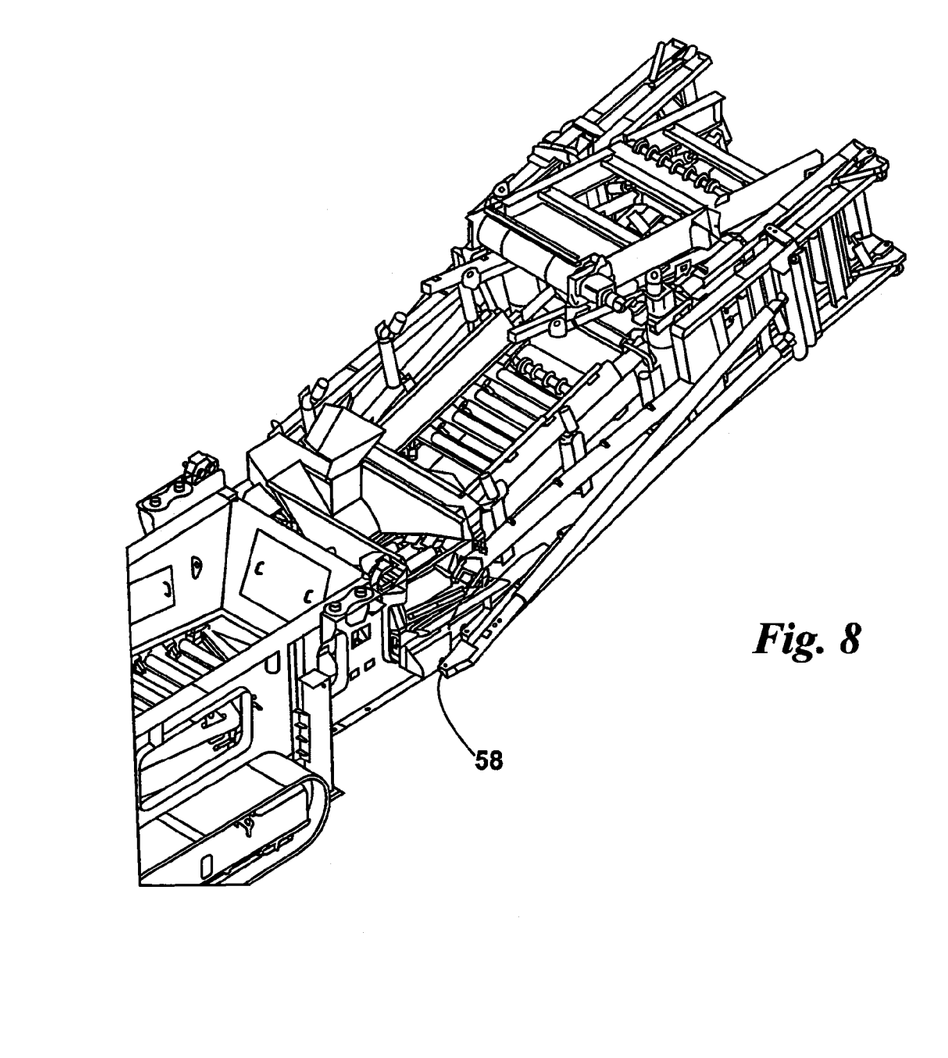
FIG. 8 is a perspective view of a rear portion of a screening unit incorporating a conveyor system shown in a transport position.

The second operating means also comprises a pair hydraulic rams 80, 80'. The housing of the or each ram is attached to a respective side elongate member of the mid frame. The piston of the ram is attached via a joint 86 to a respective side elongate member of the upper frame. These rams are also attached to the hydraulic valve, and from there to the hydraulic fluid reservoir. Fluid from the reservoir activates the ram, causing the piston to move into and out of the housing thus driving lengthening or contracting the connection between the respective elongate side members of the mid and upper frame sections and causing pivotal movement of the upper frame section about the pivot axis The frame is foldable to and from an inoperative position and an operative position. In the inoperative position, the mid and upper frame sections are folded parallel to one another and extend, in one embodiment, rearwardly from an end 8 of the screening unit as can be seen in FIG. 6. Transversely extending rungs 30 on the mid and upper frames are orientated substantially vertically in the inoperative position. As can be seen in FIG. 6 side conveyor systems on opposing sides of the screening unit are folded and extend backwards on either side of a rearwardly extending conveyor system in the inoperative position and furthermore the side conveyor systems are folded within the width of the body of the screening unit thus reducing, or at least not extending the overall envelope of the screening unit. In alternative embodiments it is envisaged that the side conveyor system could be located in a more forward position on the screening unit. In such a case the side conveyor system may fold adjacent the side of the screening unit such that the width is increased but by a relatively small degree. Alternatively the screening unit may be adapted and arranged to provide for recesses in the side of the unit into which the side conveyor system may be located in the inoperative position.

The second and third pivot axes about which the mid and upper frame sections pivot is substantially oblique to the first pivot axis about which the mid frame section pivots relative to the base frame section, allowing the frame sections to lie in their stored positions as shown in FIG. 6. This allows a favourable compromise to be reached as between the size of the basic screening unit (and thus its total throughput capacity) and its maximum width dimension (including side conveyors) when those side conveyors are in inoperative, storage position. This is particularly valuable when it is desired to move such a screening unit along a public road.

Furthermore in the inoperative position the conveyor belt is folded in a transverse plane to the direction of movement of the belt thus reducing wear and strain on the belt in the inoperative position.

To unfold the sections, each ram of the first operating means is activated to extend the piston from the housing. This causes the mid frame section to pivot about the pivot joints, laterally swinging, twisting and lowering the mid frame into a position substantially in line with the base frame section. At the same time, the second operating means is activated to push the piston of the ram or rams connecting the mid frame and upper frame sections out of the housing. This causes upper frame section to pivot about the pivot axis, rotating the upper frame section around the axis and substantially into line with the mid frame section. Thus the frame takes up its operative position as shown in FIG. 3*a*, and a conveyor belt can be supported by and travel along the frame sections. Material screened by the unit can then be carried by the conveyor belt from the screening device of the unit to a stockpile therefore. The legs support the mid and upper frame sections in their operative position, and the majority of the weight of these sections is carried by the legs. The mid frame section and the legs together form a tripod-like structure.

In a preferred mode of operation the upper frame is folded over until the upper frame is abutting the mid frame. The mid frame is then rotated around the lower pivot axis into the inoperative position. It is however envisaged that these operations need not be carried out consecutively but may be carried out simultaneously. In such a case the operation must be controlled such that the upper frame does not interfere with any rearwardly extending conveyors of the screening unit. In moving from the inoperative to the operative position the mid frame is preferably moved to the operative position first and then the upper frame unfolded to move into line with the mid frame and base frame section.

It is envisaged that it might be desirable to connect the mid frame to the base frame section using the angled pivot hinge and to provide suitable operating means acting on the mid or second frame section to pivot the mid or second frame about the pivot hinge relative to the base or first frame section. The operating means may be the same as that already described but it would be possible to utilise a single operating means such as a ram acting to cause the second frame means to pivot. Alternative support means may be provided, such as for example a single telescopic member or one of the support members may be fixed and the other may be extendable. It may be necessary in such a case to provide means of rotation at the upper end of the support members in order to allow for the movement of the mid or second frame. It is also envisaged that the support means could be moveably connected by means of alternative jointing structures.

We claim:

1. A conveyor system comprising:
a base frame section, a mid frame section movably connected to the base frame section and an upper frame section movably connected to the mid frame section;
a first operating means operable on the mid frame section, and a second operating means operable on the upper frame section, the first and second operating means acting to move the mid and upper frame sections between an operative position wherein they lie substantially in line with each other and the base frame section, to an inoperative position wherein the mid and upper frame sections are displaced with respect to the base frame section; and
the first operating means acting to pivot the mid frame section relative to the base frame section about a first pivot axis, and the second operating means acting to pivot the upper frame section relative to the mid frame section about a second pivot axis wherein in the operative position the first and second pivot axes are obliquely angled relative to one another.

2. The conveyor system according to claim 1, in which the first pivot axis is aligned at a first angle to the horizontal and at a second angle to the vertical.

3. The conveyor system according to claim 1, in which the base frame section is connected to the mid frame section by a first pivot joint.

4. The conveyor system according to claim 1, in which a support means is movably connected at a first end thereof to the base frame section and at a second end thereof to the mid frame section.

5. The conveyor system according to claim 4, in which the support means is movably connected to the base frame section by a further pivot joint.

6. The conveyor system according to claim 5, in which the further pivot joint comprises a rotatable shaft extending from the base frame section, and first and second pivot plates mounted on the support means connected to the mid frame section.

7. The conveyor system according to claim 4, in which the support means is connected to the mid frame section by an upper pivot hinge, each upper pivot hinge arranged to allow the mid frame section to rotate about the base frame section.

8. The conveyor system according to claim 4, in which the support means comprises at least one telescopic leg.

9. The conveyor system according to claim 4, in which the support means comprises at least two support members, and the support members vary in length as the mid frame section rotates about the first pivot axis.

10. The conveyor system according to claim 1, in which the second operating means is operative simultaneously with the first operating means.

11. The conveyor system according to claim 1, in which the mid frame section is connected to the upper frame section by a second pivot joint.

12. The conveyor system according to claim 11, in which at least one first arm extends from the mid frame section and is pivotally connected to at least one second arm connected to the upper frame section, a third arm depends from the pivotal connection to the mid frame section, and the second operating means is connected to the at least one first arm and operates thereon to shorten the first arm causing the upper frame to rotate about the second pivot axis.

13. The conveyor system according to claim 1, which the upper frame section is parallel to the mid frame section when in the inoperative position.

14. The conveyor system according to claim 1, in which the second pivot axis is transverse to a longitudinal axis of the mid frame in the operative position.

15. The conveyor system according to claim 14, in which the upper frame section rotates about the second pivot axis and folds over and parallel to the mid frame section and abuts against the mid frame section in at least the inoperative position.

16. The conveyor system according to claim 1, in which the mid and upper frame sections and the base frame section provide support for a conveyor belt.

17. The conveyor system according to claim 1, in which least one of the base frame section is secured to a screening unit and the base frame section is part of the screening unit.

18. The conveyor system according to claim 17, in which the mid and upper frame sections extend outwardly from the screening unit and in a substantially upward direction when in the operative position.

19. The conveyor system according to claim 18, in which the mid and upper frame sections project out substantially at right angles to the screening unit and are upwardly inclined at an angle between 20 and 30 degrees to the horizontal.

20. The conveyor system according to claim 19, in which the mid and upper frame sections are upwardly inclined at an angle of substantially 22 degrees to the horizontal.

21. The conveyor system according to claim 17, in which in the inoperative position, at least the mid and upper frame sections lie substantially parallel to a side of the screening unit.

22. The conveyor system according to claim 17, in which in the inoperative position, the mid and upper frame sections extend longitudinally from the side of the screening unit in a rearward direction.

23. The conveyor system according to claim 17, in which the mid and upper frame sections rotate such that at least one of the mid and upper frame sections abut an envelope of the screening unit in the inoperative position.

24. The conveyor system according to claim 17, in which the screening unit has a width and, when in the inoperative position, the mid and upper frame sections are located substantially in the width of the screening unit.

25. The conveyor system according to claim 17, in which the screening unit is arranged so that the upper and mid frame sections, when in the inoperative position, rest substantially in one of a recess and cut back section of a side of the screening unit.

26. A screening unit comprising one or more conveyor systems according to claim 1.

27. A foldable frame comprising;
a first frame section and a second frame section pivotably connected to the first frame section, and operating means operable on the second frame section, the operating means acting to move the second frame section between an operative position wherein the first and second sections lie substantially in line with each other and an inoperative position wherein the second frame section is folded with respect to the first frame section, the operating means acting to pivot the second frame section relative to the first frame section about a first pivot axis wherein the first pivot axis comprises a fixed pivot hinge arranged such that the first pivot axis is at a first angle with respect to a horizontal plane and at a second angle with respect to a vertical plane.

28. The foldable frame according to claim 27, in which the first and second frames each have belt supporting means supporting a belt and the first pivot axis is angled such that the second frame can be pivoted from an operative position in which the belt supporting means of the first and second frames are substantially in line with one another to an inoperative position in which the belt supported by means of the second frame is substantially vertically orientated.

29. The foldable frame according to claim 27, in which the foldable frame comprises an upper frame that is movably connected to the second frame.

30. The foldable frame according to claim 29, in which the upper frame is movably connected to the second frame by means of a pivot joint.

31. The foldable frame according to claim 30, in which a pivotal axis of the pivotal joint between the upper and second frames is inclined to the first pivot axis.

* * * * *